Feb. 5, 1963    M. N. ZEOLLA ET AL    3,076,777
SEALING COMPOSITION OF POLYBUTENE AND BUTYL
RUBBER, METHOD OF PREPARATION AND
METHOD OF SEALING THEREWITH
Filed Sept. 28, 1959

INVENTORS
MARIO N. ZEOLLA
GERALD E. KUNKLE and
BY GEORGE H. BOWSER

Oscar L. Spencer
ATTORNEY

United States Patent Office 3,076,777
Patented Feb. 5, 1963

3,076,777
SEALING COMPOSITION OF POLYBUTENE AND BUTYL RUBBER, METHOD OF PREPARATION AND METHOD OF SEALING THEREWITH
Mario N. Zeolla, Gerald E. Kunkle, and George H. Bowser, New Kensington, Pa., assignors to Pittsburgh Plate Glass Company, Allegheny County, Pa.
Filed Sept. 28, 1959, Ser. No. 842,849
7 Claims. (Cl. 260—33.6)

This invention relates to flowable sealing compositions and it has particular relation to flowable sealing compositions suitable for needle glazing and caulking applications. The term "needle glazing compound" as used hereafter in this application is intended to describe compositions which can be extruded or otherwise flowed into crevices ranging in width down to 1/8 inch or less.

One of the object of the invention is to provide an extrudable or flowable sealing composition which can be cured in place after application to produce a durable adhesive seal which has good resistance to cold flow and will remain permanently in place.

A second object of the invention is to provide a sealing composition which can be readily flowed, extruded or otherwise applied to a flowable condition into small recesses between abutting parts and which will cure in place to form a durable moisture and vapor impervious seal.

Another object of the invention is to provide a stable sealing composition in an organic solvent which will cure or vulcanize in place to form a sealing compound having cold flow resistance, elasticity, moisture and vapor impermeability, resistance to extremes of temperature and ultraviolet radiation and possessing durable adhesion to glass, metal and wood.

The sealing compositions of the present invention consist of solutions of a polybutene, butyl rubber and a vulcanizing agent. The solids content of the composition may vary between 10 to 80 percent by weight of the composition to suit specific needs and uses. The vulcanizing agent may be any conventional vulcanizing agent which is commonly employed to vulcanize butyl rubber. These compositions have a viscosity range of about 10,000 to 3,000,000 centipoises at 80° F.

In manufacture, the butyl rubber and polybutene are mixed to form a homogeneous blend and then dissolved in the solvent. The vulcanizing agent is added to the solution and the mixing of the vulcanizing agent into the solution is carried on at a relatively low temperature, i.e., below 100° F., in order to prevent activation of the vulcanization reaction in the mixture. This permits adequate storage life of the composition prior to use. In use, the composition is applied as a seal or adhesive as desired and in the course of a few days or a few weeks, depending upon the formulation, the vulcanization reaction takes place. The vulcanized composition has a satisfactory tensile strength, elasticity, resistance to cold flow, adhesion to glass, metal and wood, moisture and vapor impermeability and excellent aging and weathering characteristics.

The term "butyl rubber" is intended to define rubber-like polymeric substances produced by polymerization of an olefin, for example, isobutylene, and a diolfin of a group including butadiene, isoprene, dimethylbutadiene, pentadiene and piperylene, said polymeric substances containing 70 to 99.5 parts by weight of the olefin and 30 to 0.5 parts by weight of the diolefin. These copolymers are produced by low temperature polymerization using a solution of aluminum chloride in a low freezing solvent such as ethyl or methyl chloride at temperatures ranging from −10° C. to −100° C. or lower. The polymer thereby produced has a molecular weight between 25,000 and 100,000.

Various grades of butyl rubber, such as GR–I, GR–I–17, GR–I–14 and GR–I–15, differ in amount of diolefin contained therein and in the rate at which they may be cured. Other grades such as GR–I–40, GR–I–60 and GR–I–80 differ in viscosity. This nomenclature refers to butyl rubber formerly manufactured by the U.S. Government. The same materials are now available from private sources by other designations. Manifestly, therefore, the grade of butyl rubber and the amount thereof admixed with the polybutene is determined by the physical characteristics which are desired in the final sealing compound.

The term "polybutene" is intended to define polymers or copolymers of monoolefins containing four carbon atoms such as isobutylene, butene-1 and butene-2 and mixtures of the polymers and/or copolymers. These polymers or copolymers may be polymers of the pure compounds or may be polymers of unsaturated four carbon atom fractions resulting from petroleum distillations. The polybutenes which have been found to be useful in the practice of the invention are low molecular weight polybutenes having a molecular weight between 300 and 15,000. For example, one embodiment of the invention uses polyisobutylene having a molecular weight of about 10,000 to 15,000, whereas another embodiment of the invention utilizes polymers of mixtures of butene-1, butene-2 and isobutylene having molecular weights between 300 to 2,000.

It is possible for as little as 45 parts by weight and as much as 210 parts by weight of polybutene to be combined with 100 parts by weight of the butyl rubber in vulcanizable solutions which are useful as sealing compositions in the practice of the invention. It has been found that when a polybutene such as polyisobutylene having a molecular weight of about 10,000 to 15,000 is employed in combination with butyl rubber having a molecular weight of about 50,000 to 65,000, it is preferred to use about 100 to 210 parts by weight of the polyisobutylene based on 100 parts by weight of the butyl rubber; whereas, when a polybutene such as a polymer of butene-1, butene-2 and isobutylene having a molecular weight of 300 to 2,000 is employed, it is preferred to use lesser amounts, for example, 45 to 65 parts by weight of the polybutene based on 100 parts by weight of butyl rubber. Generally it has been found that the higher the molecular weight of the polybutene, the more of it that is required in relation to the butyl rubber to obtain the desired properties for the final sealing compound. Conversely, the lower the molecular weight of the polybutene within the ranges specified, the smaller the amount required with respect to the butyl rubber to provide the mixture with the desired properties. It is to be understood, of course, that the flow properties of the mixtures can be altered slightly and remain within the purview of the invention by the use of small amounts of fillers and other modifiers such as hereinafter described.

In the production of the sealing composition, the polybutene and butyl rubber are thoroughly mixed on a suitable mill. Small amounts of fillers may be added to the mixture during mixing. After the polybutene and butyl rubber have been thoroughly mixed in a suitable mixer or mill, the mixing chamber is closed so as to allow only a small opening for the introduction of the solvent to the mill. The solvent is then added to the mixture and thoroughly mixed therewith. The solvent may be naphtha, benzene, xylene or any other evaporable or volatile solvent for the mixture of polybutene and butyl rubber. During the various mixing steps, the temperature of the mixture is likely to rise due to the shearing of the polybutene and butyl rubber during mixing. It is desired that during the mixing of the solvent into the butyl rubber and polybutene, the mixing be done at as low a temperature as possible to avoid undue volatilization of the solvent. The walls of the mixing container are usually water-cooled for this purpose.

The vulcanizing agent is added to the solution thus formed. Prior to addition of the vulcanizing agent, the solution should be cooled, if necessary, to below about 100° F. in order to prevent the occurrence of the vulcanization reaction. The vulcanizing agent is added slowly during mixing so as to obtain a uniform dispersion of the agent in the solution. The mixing should be carried out at a temperature below that which is sufficient to initiate vulcanization of the composition. The compositions thus prepared range from flowable to putty-like materials and can be poured or scraped from the mixer into suitable metal containers and hermetically sealed therein. The composition in this state has very little, if any, tensile strength or elasticity.

Various vulcanizing agents can be employed in the composition. A para-dinitrosobenzene curing agent has been found to be satisfactory. The para-dinitrosobenzene curing agent is made up of a mixture of about 25 percent by weight para-dinitrosobenzene and 75 percent by weight inert wax or clay. Such a mixture is available under the trademark "Polyac." The term "para-dinitrosobenzene" as used herein and in the claims to define a vulcanizing agent is intended to include the reaction product of para-quinone dioxime and an oxidizing agent such as $PbO_2$ which may be added separately to the mixture of butyl rubber and polybutene and reacted in situ therein. This reaction is described in an article by P. J. Flory and J. Rehner, volume 38, page 500 of Industrial Engineering Chemistry (1956). Other vulcanizing agents such as sulphur and sulphur liberating compounds can be employed by themselves or in combination with para-dinitrosobenzene to produce the needle glazing compound.

The amount of vulcanizing agent employed depends upon the amount which is required to obtain the desired properties in the cured product. It may range from about 0.5 to 5 percent by weight based upon the weight of the butyl rubber depending upon the activity of the agent and the amount of polybutene. Conventional accelerators are employed with the vulcanizing agent where necessary. The amount of vulcanizing agent which is employed is greater as the ratio of polybutene to butyl rubber is greater.

It is conventional practice in working with butyl rubber to employ a small amount of zinc oxide, about 1 to 15 parts by weight to 100 parts by weight of butyl rubber in the sealing composition to aid in the "mixability" of the composition and to increase the resistance of the final sealing compound to deterioration upon exposure to ultraviolet radiation. While not an essential part of the composition and final sealing compound, it has been included therein for these desirable effects.

In order for the sealing composition and final sealing compound to have a more pleasing and uniform appearance, it has been found desirable to incorporate therein small amounts of carbon black. The compound may contain up to about 40 parts by weight of carbon black based on 100 parts by weight of the solid contents of the composition. Smaller amounts of the order of 1 to 20 parts by weight of carbon black based upon 100 parts by weight of the solids content of the composition are usually employed. The carbon black also serves to stabilize the final sealing compound with respect to polymeric degradation caused by exposure to ultraviolet light and serves as a reinforcing agent.

The compounding of the composition as described above can be accomplished readily on a conventional cold two-roll rubber mill. Other mixing equipment, for example, a Baker-Perkins churn-type mixer equipped with dispersion-type blades and a floating ram or a Banbury type mixer may be used. The following specific compositions and mixing techniques are exemplary of the invention:

*Example I*

A flowable sealing composition is made on a churn type mixer by mixing the amounts of the following ingredients in the order listed:

| Ingredient: | Parts by weight (based on 100 parts butyl rubber) |
|---|---|
| Butyl rubber GR–I (molecular weight 65,000) | 100 |
| Polyisobutylene (Vistanex LM, MS, sold by Enjay Co., molecular weight 12,000) | 200 |
| Zinc oxide | 10 |
| Carbon black | 15 |
| Naphtha | 327 |
| Para-dinitrosobenzene curing agent (Polyac) | 2 |

During the mixing, the ingredients are maintained at as low a temperature as is possible, especially during the mixing in of the naphtha and the para-dinitrosobenzene curing agent. This is done by circulating cooling water through the jacket of the mixer. During the addition and mixing of the vulcanizing agent, the temperature is maintained at below 100° F. The material thus made has a viscosity of 60,000 to 70,000 centipoises at 80° C. as measured by a Brookfield viscometer using spindle No. 4 rotating at 2 r.p.m. The sealing composition is flowable and it can be poured from the mixer into containers suitable for sale. The containers are then hermetically sealed.

*Example II*

The sealing composition is made on a churn-type mixer by mixing the amounts of the following ingredients in the order listed:

| Ingredients: | Parts by weight (based on 100 parts butyl rubber) |
|---|---|
| Butyl rubber GR–I (molecular weight 65,000) | 100 |
| Polybutene (Oronite 64, molecular weight 1,370, a polymer of a mixture of butene-1, butene-2 and polyisobutylene) | 50 |
| Zinc oxide | 5 |
| Carbon black | 7.5 |
| Benzene | 163.5 |
| Para-dinitrosobenzene curing agent (Polyac) | 1 |

The material is compounded as descriebd in Example I and has a viscosity of 80,000 to 120,000 centipoises of 80° F. as measured by a Brookfield viscometer using spindle No. 5 rotating at 2 r.p.m.

*Example III*

A sealing composition noted for exceptionally long shelf life is made by mixing the amounts of the following ingredients in the order listed on a churn-type mixer:

| Ingredients: | Parts by weight (based on 100 parts butyl rubber) |
|---|---|
| Butyl rubber GR–I (molecular weight 65,000) | 100 |
| Polybutene—Oronite 128 (a polymer of butene-1, butene-2 and isobutylene having a molecular weight of 1500) | 21 |
| Zinc Oxide | 5.0 |
| Polybutene—Oronite 32 (a polymer of a mixture of butene-1, butene-2 and isobutylene having a molecular weight of 1200) | 25 |
| Caron black | 49.5 |
| Naptha | 137.5 |
| Dispersion of vulcanizing agent | 5.9 |
| Made of the following— | |
| Para-dinitrosobenzene curing agent (Polyac) | 1.0 |
| Sulphur | 0.5 |
| 2-mercaptobenzothiazole | 0.3 |
| Polybutene (Oronite 32) | 4.1 |

The butyl rubber is added to the mixer in small pieces. The oronite 128 is added in six equal parts and the mixture is thoroughly milled after each addition. Zinc oxide and caron black are next added in small amounts at a time and milled until a uniform blend is obtained. The Oronite 32 is next added in six equal parts and the mixture is thoroughly milled after each addition. The mixer is then covered and naphtha is added slowly through a small opening in the cover while mixing is continued to form a uniform blend of the ingredients in the naphtha.

The temperature of the mixture is taken after addition of the solvent. If it is less than 100° F., the vulcanizing agent is added to the mix. If it is above 100° F., the mixture is cooled before the vulcanizing agent is added. The addition of the vulcanizing agent to the mixture should be at a temperature sufficiently low that the vulcanization reaction is not initiated. The vulcanizing agent is made up in the form of a blend of the para-dinitrosobenzene curing agent, sulphur and 2-mercaptobenzothiazole dispersed in Oronite 32. The blend is added to the other ingredients and mixed therewith at a temperature preferably between room temperature and 100° F. The composition as thus mixed is flowable and it is poured from the mixer into suitable metal containers. The containers are hermetically sealed and the composition can be stored for many months prior to use. The sulphur in this composition appears to have a depressing effect on the activation of the para-dinitrosobenzene curing agent and the sealing composition has improved shelf life over solutions containing the para-dinitrosobenzene curing agent as the sole curing agent. To achieve this effect the sulphur is employed in a range of about 0.3 to 2 parts by weight of sulphur to one part by weight of para-dinitrosobenzene curing agent.

The compositions of the examples can be made with varying amounts of solvent to produce compositions of varying viscosities suitable for different uses. For example, the composition of Example III containing 60 percent by weight of solids is especially useful as a needle glazing compound to seal small cracks between joining metal pieces or other joining parts of a glazing structure. A composition containing 50 to 60 percent by weight of solids is suitable for use as a glazing sealer in automobile windows which are mounted in a rubber edge molding. Compositions of lower solids content, i.e., 30 to 50 percent by weight of solids, may be employed in reglazing automobile windows for ease of application, and compositions of even lower percent solids, i.e., 10 to 35 percent by weight of solids can be applied to surfaces of metal and other materials by dipping, brushing, spraying, etc. and used as a paint or protective coating. In each composition, the solvent evaporates and the composition vulcanizes to an appreciable extent to form the sealing compound within a few days.

*Example IV*

A composition as described in Example III containing instead 100 parts by weight of carbon black and sufficient naptha to produce a 60 percent by weight solids composition is made according to the procedure set forth in Example III, and a satisfactory needle glazing sealer is produced.

*Example V*

A sealing composition is prepared as in Example IV with the exception that polyisobutylene having a molecular weight of about 12,000 is used to replace both the Oronite 128 and Oronite 32 in Example III. The polyisobutylene is added to the butyl rubber prior to the addition of zinc oxide and carbon black. A satisfactory needle glazing composition is produced.

*Example VI*

The composition of Example I is formed according to the procedure of the example with the exception that 0.5 part by weight of sulphur and 0.3 part by weight of 2-mercaptobenzothiazole are employed as the vulcanizing agent in place of the para-dinitrosobenzene curing agent. A needle glazing composition is produced.

The uses of the compositions of the present invention and their properties in use may be further described in combination with the drawing in which.

Figure 1:
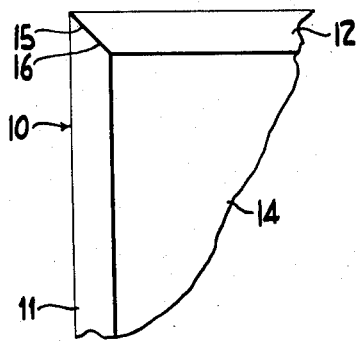
FIG. 1 is a partial elevation of a glazing structure illustrating the use of the needle glazing compound containing approximately 60 percent by weight of solids.

In FIG. 1 of the drawing there is shown a partial elevation of a window 10 which is composed of a vertical framing member 11 and a horizontal framing member 12 enclosing glass pane 14. The framing members 11 and 12 meet at a mitered joint 15 at the corner of the window. The joint 15 is not always exactly perfect and it sometimes permits moisture and water vapor to penetrate the joint and cause the framing members to corrode or the joint to swell in case of freezing of entrapped moisture. The needle glazing composition 16 of this invention is applied by means of a calking gun to the joint 15 to seal any opening therein. The composition is flowed into the gun and then pressed or extruded from a small opening in a nozzle of the gun into the joint 15. The solvent of the composition evaporates within a few days and the composition cures to form the sealing compound having the desired properties. This is only one example of how the needle glazing compositions can be employed in a glazing structure, and other examples are readily apparent to anyone skilled in the glazing art.

Figure 3:
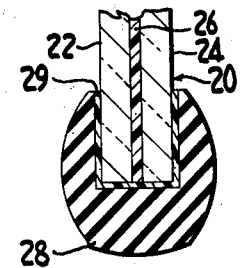
FIG. 3 is a sectional view taken along lines III—III of FIG. 2.
Figure 2:
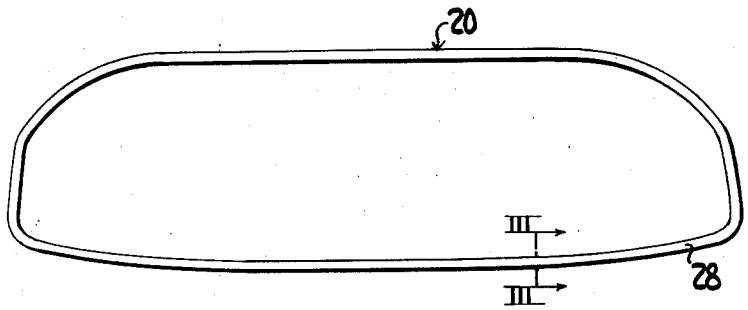
FIG. 2 is an elevation of an automobile window ready for glazing.

FIGS. 2 and 3 illustrate a windshield 20 suitable for use in an automobile. The windshield is composed of two sheets of glass 22 and 24 adhered together by a conventional plastic interlayer 26. The windshield is set in a rubber molding 28 which is used for mounting the windshield in the opening therefor in the automobile. The glazing composition 29 of the present invention composed of approximately 50 parts by weight of solids per 100 parts by weight of total composition is extruded into the space between the edges of the windshield and the molding 28 by means of a conventional extrusion gun. This sealing composition vulcanizes in place to form a tacky, moisture and vapor impermeable bond between the windshield and molding 28. The cured sealing compound has resistance to cold flow and to deterioration upon exposure to ultraviolet light.

Figure 4:
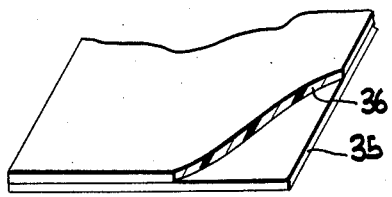
FIG. 4 illustrates a metal panel coated with a protective coating composition of the invention.

FIG. 4 illustrates a metal panel 35 which has a coating of the sealing composition 36 on it. The composition 36 is produced by applying a flowable solution of the sealing composition containing about 20 parts by weight of solids per 100 parts by weight of total composition on the surface of the sheet 35. The viscosity of the composition containing only about 20 percent by weight of solids is sufficiently low to permit its application by means of a brush or a spray gun. The sealer composition vulcanizes subsequently to provide a tight, adhesive, moisture and vapor impermeable coating on the sheet 35.

The sealing compositions of the present invention provide durable, adhesive sealing compounds which are impermeable to moisture and water vapor. The cured sealing compound has resistance to cold flow and has a tensile strength of the order of about 5 to 40 pounds per square inch, an elongation of about 1500 to more than 2200 percent, tack of about 8 to 40 grams and a Shore A hardness of about 5 to 20. The cured sealing compounds were tested for their tensile strength, elongation and tack in an Instron tensile testing instrument, Model No. TT-C. The tensile strength was measured by clamping two ends of a strip between jaws on the instrument and moving the jaws apart at a rate of 20 inches per minute so as to exert a pulling force on the test strip. The measurement of the load on the sample at an elongation of 200 percent was taken as the tensile strength of the sample. The tensile strength in pounds per square inch was then calculated for the initial cross-section of the sample. The tack was obtained by projecting a glass rod of ¼ inch diameter against the sample so as to make surface contact and then measuring the force required to pull the rod away from the sample at a rate of 20 inches per minute. This was obtained in terms of grams of force. Hardness was obtained according to the Shore Durometer test (ASTM–D676–49T) for the initial hardness. The sealing compounds have good cohesion as well as adhesion to other materials such as glass, metal, wood, rubber and plastic.

Although the present invention has been described with respect to specific details of certain embodiments thereof, it is not intended that such details be limitations upon the scope of the invention except insofar as set forth in the accompanying claims.

We claim:

1. A readily flowable, room temperature vulcanizable, slow curing, plastic sealing composition, said composition consisting essentially of
   (a) a low molecular weight hydrocarbon polymer of a monoolefinically unsaturated hydrocarbon monomer having four carbon atoms, said low molecular weight polymer having a molecular weight ranging from 300 to 15,000;
   (b) a vulcanizable high molecular weight hydrocarbon copolymer of
      (1) 70 to 99.5 parts by weight of a monoolefinically unsaturated hydrocarbon monomer having four carbon atoms, and
      (2) 0.5 to 30 parts by weight of a diolefinically unsaturated hydrocarbon monomer having from four to six carbon atoms,
   said high molecular weight copolymer having a molecular weight ranging from 25,000 to 100,000;
   (c) a hydrocarbon solvent for the said low molecular weight polymer (a), and the said high molecular weight copolymer (b), said solvent being vaporizable at room temperature and atmospheric pressure; and
   (d) a vulcanizing agent which is incapable of effecting vulcanization in the presence of solvent (c) recited hereinabove at temperatures below 100° F. while at atmospheric pressure, yet which is capable of effecting gradual, delayed vulcanization at room temperature while at atmospheric pressure upon evaporation of said solvent, said vulcanizing agent being dispersed in said solvent; and wherein the weight ratio of said low molecular weight polymer (a) to said high molecular weight polymer (b) is from 0.45 to 2.1:1.

2. The sealing composition of claim 1 which contains small amounts of zinc oxide and carbon black.

3. The sealing composition of claim 1 wherein the said vulcanizing agent comprises para-dinitrosobenzene as an active vulcanizing agent.

4. The sealing composition of claim 3 which includes sulphur as an adjuvant vulcanizing agent which further delays the vulcanizing action of para-dinitrosobenzene.

5. The sealing composition of claim 3 wherein the said solvent is naphtha.

6. A method of making a flowable, room temperature vulcanizable, slow curing, plastic sealing composition, which method comprises the steps of:
   (A) forming a homogeneous blend of
      (a) a low molecular weight hydrocarbon polymer of a monoolefinically unsaturated hydrocarbon monomer having four carbon atoms, said low molecular weight polymer having a molecular weight ranging from 300 to 15,000, and
      (b) a vulcanizable high molecular weight hydrocarbon copolymer of
         (1) 70 to 99.5 parts by weight of a monoolefinically unsaturated hydrocarbon monomer having four carbon atoms, and
         (2) 0.5 to 30 parts by weight of a diolefinically unsaturated hydrocarbon monomer having from four to six carbon atoms, said high molecular weight copolymer having a molecular weight ranging from 25,000 to 100,000; the weight ratio of said low molecular weight polymer (a) to said high molecular weight copolymer (b) being from 0.45 to 2.1:1;
   (B) dissolving the said blend of (a) and (b) in a hydrocarbon solvent for (a) and (b) to form a solution of the blend; and
   (C) adding a vulcanizing agent to the said solution while maintaining the temperature of the said solution at a temperature below that at which vulcanization takes place in the presence of said solvent, said vulcanizing agent being incapable of effecting vulcanization at atmospheric pressure at temperatures below 100° F. while in the presence of said solvent, yet capable of effecting gradual, delayed vulcanization at room temperature while at atmospheric pressure upon evaporation of said solvent.

7. A method of sealing which comprises applying the vulcanizable sealing composition of claim 1 to a structure to be sealed, and allowing the said composition to vulcanize in place.

References Cited in the file of this patent

UNITED STATES PATENTS

| | | |
|---|---|---|
| 2,409,336 | Young | Oct. 15, 1946 |
| 2,547,733 | Baldwin | Apr. 3, 1951 |
| 2,864,882 | Snell | Dec. 16, 1958 |
| 2,884,982 | Sparks et al. | May 5, 1959 |
| 2,903,437 | Van Epp | Sept. 8, 1959 |